Patented Apr. 20, 1943

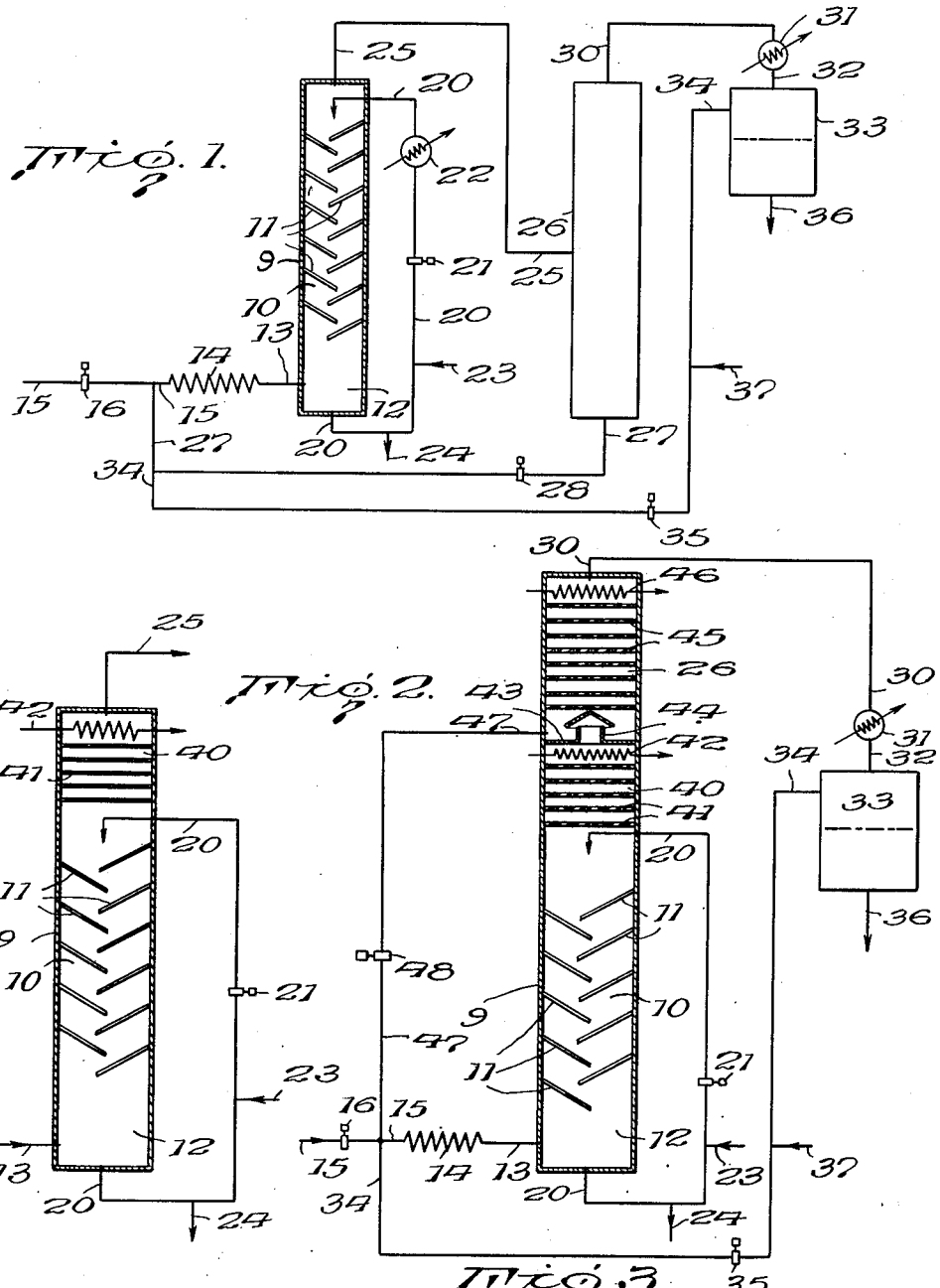

2,317,241

UNITED STATES PATENT OFFICE 2,317,241

PRODUCTION OF ISOBUTANE

William A. Ackerman, Lansdowne, and William S. Bonnell, Oakmont, Pa., assignors to Gulf Research & Development Company, Pittsburgh, Pa., a corporation of Delaware Application October 18, 1940, Serial No. 361,788

8 Claims. (Cl. 260—683.5)

This invention relates to the production of isobutane; and it comprises a process of continuously isomerizing normal butane to isobutane which comprises establishing and maintaining a body of inert liquid containing an aluminum halide dispersed therein, said liquid having a boiling point substantially higher than that of normal butane, continuously withdrawing a portion of said dispersion from the body thereof and returning said portion to the body in a downward path, maintaining said body of dispersion at a temperature sufficient to produce a substantial amount of aluminum halide vapors therefrom, continuously introducing normal butane into contact with said dispersion, conducting butane vapors and aluminum halide vapors from said body upwardly in countercurrent contact with liquid dispersion descending in said downward path, cooling said vapors to condense the aluminum halide contained therein, returning the condensed aluminum halide to said body of dispersion, separating normal butane from the isobutane thus formed and removing and recovering said isobutane; all as more fully hereinafter set forth and as claimed.

Isobutane is obtainable from normal butane by contacting the latter with an aluminum halide catalyst. In the commercial production of isobutane by this procedure, it is desirable to operate continuously and to obtain a high rate of isomerization. For a high rate of isomerization, it is necessary to operate at elevated temperature; in the case of aluminum bromide, advantageously about 80° to 100° C., and in the case of aluminum chloride, advantageously about 100–150° C. High rates of isomerization are also promoted by maintaining an intimate contact between the aluminum halide catalyst and the normal butane.

One of the difficulties of carrying out such a process continuously on a commercial scale is the fact that at temperatures sufficiently high to effect desirable rates of isomerization, the aluminum halide catalyst is extensively volatilized and carried out of the reaction zone. This is particularly true in processes where a stream of normal butane vapor is intimately contacted with the aluminum halide catalyst at an elevated temperature and the vaporous product of reaction is carried off from the reaction zone. As a result of catalyst loss the rate of isomerization falls off and control is rendered difficult in a continuous production plant.

It is an object achieved by this invention to provide a continuous process for the isomerization of normal butane that may be conducted at temperatures at which the aluminum halide catalyst has a substantial vapor pressure, without excessive catalyst loss. It is a further object achieved by this invention to obtain increased yield of isobutane by effecting contact between gaseous normal butane and aluminum halide vapors, such contact being referred to hereinafter as "vapor phase" contact, as well as contact between gaseous normal butane and aluminum halide dissolved or dispersed in a liquid, such contact being referred to hereinafter as "liquid phase" contact, regardless of whether the butane is in true solution or mechanical admixture.

In carrying out the method of our invention, we make use of a liquid catalyst consisting of a dispersion of an aluminum halide in an inert liquid such as is described in the copending application for United States patent of Charles W. Montgomery, Serial No. 314,319, filed January 17, 1940. By "inert liquid" as used herein and in the claims, we mean a liquid which, under the conditions of isomerization of normal butane to isobutane by contact with an aluminum halide catalyst, does not react substantially with the aluminum halide catalyst or destroy its activity and which does not react substantially with the reactant and reaction product. The catalyst dispersion is a suspension of solid aluminum halide such as aluminum chloride or aluminum bromide in an inert liquid having a boiling point higher than that of normal butane and inert to the reactants at the temperature at which the reaction is carried out; for example, carbon disulfide, carbon tetrachloride, ethyl bromide, chloroform and the like. In certain embodiments of the invention an added advantage is obtained by selecting as the dispersion medium an inert liquid more volatile than the aluminum halide dispersed therein. Thus, the dispersion medium may serve as reflux to assist in fractional separation of aluminum halide from the vapors under treatment.

A body of this catalyst dispersion is brought to a temperature sufficient to cause a substantial vaporization of the aluminum halide and there maintained. The resulting vapor of aluminum halide and a supply of gaseous normal butane are conducted upwardly through a contacting zone, which may be one of the usual types of contacting apparatus such as a baffle tower or a bubble tray tower. A portion of the aforementioned liquid catalyst dispersion is circulated from the main body thereof to a point in the above-mentioned contacting zone above the point of introduction of the gaseous normal butane and aluminum halide vapor and is allowed to flow downwardly in counter-current contact with the gas and vapor and thence back into the main body of dispersion. By this means both vapor phase and liquid phase contact between the normal butane and the catalyst are effected. In one modification of the invention, the liquid phase contact may be further promoted by causing the normal butane entering the system to pass into the main body of dispersion, as by bubbling it through the dispersion, and then through the vapor phase-liquid phase contacting zone. In this case, not only is the liquid phase contact promoted, but the normal butane vapor introduced into or generated from the main body of dispersion serves to vaporize the aluminum halide and carry away the vapor to the vapor phase-liquid phase contacting zone.

After suitable contacting in the vapor phase-liquid phase contacting zone, the aluminum halide vapors are condensed out by cooling and returned to the liquid catalyst dispersion, the normal and isobutane are separated from the remaining gas, the isobutane is recovered for use, and the unreacted normal butane is recycled.

Depending upon the temperature employed and the nature of the inert liquid which serves as the catalyst dispersion medium, substantial quantities of the inert liquid may or may not be vaporized and carried out of the condensing portion of our system. When substantial quantities of inert liquid are thus vaporized and carried into the condensing portion of the system, the vapor of inert liquid may be then condensed along with the aluminum halide, in which case the condensate of inert liquid serves the useful purposes of providing a fluid medium for collecting and transporting the condensed aluminum halide, which is a solid. It is an important aspect of certain modifications of our invention that this feature is provided for.

The cooling of the mixed vapors of normal butane, isobutane and aluminum halide, and in some cases of inert liquid, for separation and recovery of the isobutane and return of the other constituents to the system may be accomplished in various ways. One suitable method is to cool the portion of the catalyst dispersion circulated to the upper part of the vapor phase-liquid phase contacting zone to such temperature that it acts to condense the aluminum halide vapor present in the contacting tower. The condensed aluminum halide in this method is carried back to the main catalyst dispersion by the portion of the dispersion descending through the vapor phase-liquid phase contacting zone. If substantial amounts of inert liquid vapor exist, they too may be condensed by the circulated catalyst dispersion and hence retained in the system. The mixed normal butane and isobutane vapors remaining are conducted out of the contact zone and separately condensed, the normal butane being advantageously recycled, and the isobutane being recovered for use. If substantial quantities of inert liquid vapor are carried out of the vapor phase-liquid phase contacting zone, as may be the case where a liquid substantially more volatile than aluminum chloride is employed as the catalyst dispersion medium, this vapor may be separately removed by condensation before separation of the isobutane and normal butane is effected, and the separated inert liquid returned to the system.

A second method of carrying out the process of our invention is to circulate hot catalyst dispersion to the top of the vapor phase-liquid phase contacting zone. A reflux condenser may then be provided at the top of this zone above the point of introduction of the circulated catalyst dispersion, and the aluminum halide vapors, along with inert liquid vapors if such exist in substantial quantity, may be condensed by this condenser and carried back to the main body of catalyst dispersion by the circulated catalyst dispersion. Mixed vapors of normal butane and isobutane are withdrawn and separately condensed, the normal butane being recycled and the isobutane being recovered for use.

If desired this latter method may be modified by introducing the vapors leaving the contacting zone to an extended fractionating zone where an initial separation of aluminum halide is made along with inert liquid, if present, this being followed by fractional condensation of normal butane, which is withdrawn as a sidestream and recycled, the isobutane being removed overhead as vapor, and recovered.

In the accompanying drawing there are illustrated schematically three forms of apparatus useful for carrying out the method of our invention as set forth above.

Fig. 1 illustrates an apparatus useful for the method in which the circulated catalyst dispersion is cooled and serves to condense out and return the aluminum halide vapor.

Fig. 2 illustrates an apparatus useful for the method wherein the catalyst dispersion is circulated hot and it is particularly useful where substantial quantities of inert liquid are vaporized.

Fig. 3 also illustrates an apparatus useful for hot circulation of catalyst dispersion and particularly useful where inert liquid is vaporized and normal butane is to be recycled in the process.

In Fig. 1, tower 9, which is provided with a contact zone 10 containing spaced baffles 11 and with a bottom zone 12 below the baffles is connected near the bottom through conduit 13, preheater 14 and conduit 15 containing pump 16 to a suitable supply of normal butane (not shown). Bottom zone 12 may be provided with heating means (not shown). Tower 9 is also provided with a conduit 20 connecting bottom zone 12 with the top of the tower through pump 21 and cooler 22. Means for introducing liquid into and removing liquid from conduit 20 are provided by conduits 23 and 24, respectively. Tower 9 is connected at its top through conduit 25 to fractionating column 26. The bottom of fractionating column 26 is connected by conduit 27 containing pump 28 with conduit 15 and the top is connected through conduit 30, cooler 31 and conduit 32 with holding vessel 33. The upper part of holding vessel 33 is connected through conduit 34 containing compressor 35 with conduit 27 and thus with conduit 15. The bottom part of vessel 33 is provided with an outlet conduit 36. A gas inlet conduit 37 is connected with conduit 34.

In Fig. 2, tower 9 is provided at the bottom with an inlet conduit 13, connected as in Fig. 1 to a source of normal butane, and with an outlet conduit 25 at the top connected as in Fig. 1 to a fractionating column. The interior of tower 9 comprises a central contact zone 10 containing baffles 11, a bottom zone 12 and a top fractionating or condensing section 40 containing perforated plates 41 and condenser 42. Bottom zone 12 may be provided with heating means (not shown). Tower 9 is also provided with a circulation system comprising conduit 20 and pump 21 connecting bottom zone 12 with the upper portion of contact zone 10, and conduit 20 is provided with liquid inlet conduit 23 and liquid outlet conduit 24.

In Fig. 3, tower 9 contains an intermediate contact zone 10 containing baffles 11, a bottom zone 12 below the baffles, a fractionating or condensing section 40 containing perforated plates 41 and condenser 42 situated above zone 10, a trap tray 43 containing chimney 44 situated above fractionating section 40, and a second fractionating or condensing section 26 containing bubble plates 45 and condenser 46 situated above trap tray 43. Bottom zone 12 is connected through conduit 13, preheater 14 and conduit 15 containing pump 16 to a suitable source of normal butane (not shown) while the top of tower 9 is connected through conduit 30, condenser 31 and conduit 32 to holding vessel 33. Bottom zone 12 of tower 9 is connected through conduit 20 containing pump 21 to the top of contact zone 10. Conduit 20 is provided with liquid inlet conduit 23 and liquid outlet conduit 24. The space immediately above trap tray 43 is connected by means of conduit 47 containing pump 48 to conduit 15. The top portion of holding vessel 33 is connected by conduit 34 containing pump 35 with conduit 15 and the bottom of the holding vessel is connected with an outlet conduit 36. Conduit 34 is provided with a gas inlet conduit 37.

In operation, the apparatus of Fig. 1 functions as follows: A body of aluminum halide catalyst dispersed in an inert solvent having a boiling point substantially above the boiling point of normal butane is maintained in zone 12 of tower 9, and the temperature of this body of dispersion is maintained high enough to produce a substantial amount of aluminum halide vapors in the space above, advantageously about 100° to 150° C. when aluminum chloride is used. Somewhat lower temperatures may be used with aluminum bromide. Normal butane, advantageously mixed with a small amount of a hydrogen halide as a catalyst activator, is pumped by pump 16 through conduit 15, pre-heater 14 and conduit 13 into zone 12 of contact tower 9, the point of entry being either above or below the level of the dispersion, advantageously below this level. A mixture of vapors comprising normal butane, aluminum halide, and hydrogen halide rises through tower 9. A portion of the liquid catalyst dispersion is circulated from bottom zone 12 to the top of tower 9 through conduit 20 and cooler 22 by pump 21. The amount of catalyst thus cycled, and the temperature to which it is cooled, are so regulated that the upper part of tower 9 is cooled sufficiently to condense substantially all of the aluminum halide contained in the rising vapors. The rising vapors are thus contacted with the downcoming stream of catalyst dispersion and both vapor phase and liquid phase isomerization of normal butane are effected and the aluminum halide is condensed and carried back to the main body of catalyst dispersion in zone 12. Any vapor of the inert liquid of the catalyst dispersion contained in the rising vapors will also be largely or wholly condensed in the upper part of tower 9. The normal butane and isobutane vapors and hydrogen halide pass out of tower 9 through conduit 25 into fractionating column 26, where the normal butane is condensed out along with any traces of inert liquid and aluminum halide carried past the stream of catalyst dispersion in tower 10. This normal butane is circulated by pump 28 through conduit 27 into conduit 15 and back into zone 12 at the bottom of tower 9. A mixture of isobutane vapor and hydrogen halide passes out of column 26 through conduit 30 to cooler 31 where the isobutane is condensed and then passes through conduit 32 into holding vessel 33. The remaining gaseous hydrogen halide is removed from holding vessel 33 through conduit 34, compressed by compressor 35 and forced into conduit 15 and thus back into bottom zone 12 of tower 9.

Make-up hydrogen halide may be introduced as required through conduit 37 into conduit 34. Liquid isobutane is withdrawn as required from vessel 33 through conduit 36. Make-up catalyst dispersion may be introduced into conduit 20 through conduit 23 and a bleed of catalyst dispersion from the system may be effected, as required, through conduit 24.

The operation of the apparatus illustrated by Fig. 2 is similar to that described above for Fig. 1, except that no cooler is provided in the catalyst dispersion circulating system, so that the catalyst dispersion is hot when introduced at the top of the tower. A cooler 42 is provided in the top of the tower to condense the aluminum halide. In operation the preheated normal butane, advantageously mixed with a small amount of hydrogen halide, is introduced as before into bottom zone 12 of the contact tower 9 which contains the main body of catalyst dispersion, the point of entry of the normal butane being either above or below the level of the dispersion, advantageously the latter. The temperature of this catalyst dispersion is advantageously maintained at about 100° to 150° C. when aluminum chloride is used. The temperature may be somewhat lower with aluminum bromide. A mixture of vapors comprising normal butane, aluminum halide and hydrogen halide rises through contact tower 9. A portion of the hot liquid catalyst dispersion is circulated from bottom zone 12 to the top portion of tower 9 through conduit 20 by pump 21. The hot catalyst dispersion then passes down through the tower in contact with the rising gases and vapors and both vapor phase and liquid phase isomerization of normal butane are effected. The rising gases are brought into contact with cooler 42 in the extreme top of the tower at a point above the introduction of the hot catalyst dispersion. This cooler is maintained at a temperature sufficiently low to condense the aluminum halide out of the gases and at least the greater part of the vapors of inert liquid contained in the gaseous mixture. This mixture of inert liquid and aluminum halide refluxes back into the circulating catalyst dispersion and is carried back to zone 12. The mixture of normal butane, isobutane and hydrogen halide passes out of the tower and is separated as described above for Fig. 1, the normal butane and hydrogen halide being recycled, and the isobutane being collected in a holding vessel.

The apparatus of Fig. 3 functions as follows: Normal butane, advantageously mixed with a hydrogen halide, is introduced by pump 16 through conduit 15, preheater 14 and conduit 13 into the bottom zone 12 of contact tower 9, where a dispersion of aluminum halide in an inert liquid is maintained at about 100° to 150° C. in the case of aluminum chloride. A somewhat lower temperature may be used with aluminum bromide. Advantageously the inert liquid employed is chosen from those which volatilize more readily than the aluminum halide employed. The point of entry of the normal butane may be above or below the level of dispersion, advantageously the latter. A mixture of vapors containing normal butane, inert liquid, aluminum halide and hydrogen halide rises through tower 9 between baffles 11. A portion of the hot catalyst dispersion is pumped from bottom zone 12 through conduit 20 by pump 21 into the top of the baffled section of tower 9. The hot catalyst dispersion then flows down through the tower 9 in contact with the rising vapors and both liquid phase and vapor phase isomerization of normal butane are effected. The mixture of vapors then passes up into fractionating section 40. Here the vapors are brought into contact with reflux condenser 42 which is maintained at a temperature sufficiently low to condense aluminum halide and inert liquid vapors but not low enough to condense normal butane and isobutane. The condensate of aluminum halide and inert liquid thus formed refluxes back through bubble plates 41 to the contacting zone 10 and finally to the main body of dispersion in bottom zone 12. Uncondensed normal butane, isobutane and hydrogen halide vapors pass up through chimney 44 into fractionating section 26 where, by means of bubble plates 45 and reflux condenser 46, normal butane is separated by condensation and accumulates on tray tray 43 and isobutane and HCl vapors pass out of the top of tower 9 through conduit 30. As liquid normal butane accumulates on tray 43 it is pumped by pump 48 through conduit 47 into conduit 15 and thus back into zone 12. The uncondensed isobutane and hydrogen halide vapors pass out of the tower 9 through conduit 30 to cooler 31, where isobutane is condensed out and is passed through conduit 32 and collected in holding vessel 33. The uncondensed hydrogen chloride is removed from vessel 33 through conduit 34, is compressed by compressor 35 and is introduced into the main reaction zone through conduit 15, etc.

Make-up hydrogen halide and catalyst dispersion may be supplied to the system as required through conduits 37 and 23, respectively and a bleed of used catalyst dispersion may be effected, as required, through conduit 24.

It will be understood that appropriate control means not shown in the schematic drawing may be provided and that accumulations of unwanted by-products, such as permanent gases, propane and pentane, may be disposed of by appropriate means, for example by introducing bleeds and/or fractionating columns into the various lines at the proper places.

The method of our invention is useful in the continuous liquid and vapor phase isomerization of normal butane when liquid catalysts are employed other than dispersions in inert liquids. For instance, reaction products of hydrocarbons or phenols and aluminum halides have been employed as catalysts for isomerization of normal butane. Frequently such catalysts are oily liquid complexes containing free aluminum halide. When used in the present process, the body of catalyst is maintained at such temperature as to produce partial vaporization of the complex and free aluminum halide if any is present.

Although it is usually preferable to supply normal butane to the process as a gas, it is within the purview of the invention to admit it as a liquid and produce vaporization through maintenance of adequate temperatures in the zone of contact with the liquid dispersion.

It will also be understood that, while our invention has been described herein with reference to certain specific embodiments thereof, these embodiments are recited by way of illustration and the invention is not limited thereto except as hereinafter recited in the appended claims.

What we claim is:

1. A process of continuously isomerizing normal butane to isobutane which comprises establishing and maintaining a body of inert non-hydrocarbon liquid containing solid aluminum halide dispersed therein, said liquid having a boiling point substantially higher than that of normal butane, continuously withdrawing a portion of said dispersion from the body thereof and returning said portion to the body in a downward path, maintaining said body of dispersion at a temperature sufficient to produce a substantial amount of aluminum halide vapors therefrom, continuously introducing normal butane into contact with said dispersion, conducting butane vapors and aluminum halide vapors from said body upwardly in counter-current contact with liquid dispersion descending in said downward path, cooling said vapors to condense the aluminum halide contained therein, returning the condensed aluminum halide to said body of dispersion, separating normal butane from the isobutane thus formed and removing and recovering said isobutane.

2. In a continuous process of isomerizing normal butane to isobutane, the steps which comprise establishing and maintaining a body of inert non-hydrocarbon liquid containing solid aluminum halide dispersed therein, said liquid having a boiling point substantially higher than that of normal butane, maintaining said liquid body at such a temperature as to partially vaporize the aluminum halide contained therein, passing normal butane into said liquid body to establish a reaction mixture, conducting vapors from the body of reaction mixture so formed upwardly through a contacting zone, continuously withdrawing a portion of the reaction mixture from the body thereof, introducing the portion so withdrawn into said contacting zone in the path of said vapors, returning said portion to the body of liquid reaction mixture in counter-current contact with said vapors, cooling said vapors to condense out all the aluminum halide contained therein, removing vapors containing isobutane free from aluminum halide, recovering isobutane from the vapors so removed and returning condensed aluminum halide to the body of liquid reaction mixture.

3. A continuous process of isomerizing normal butane to isobutane which comprises passing gaseous normal butane into a dispersion of solid aluminum halide catalyst in an inert non-hydrocarbon liquid having a boiling point substantially higher than that of normal butane, maintaining the reaction mixture thus formed at a temperature at which the aluminum halide has a substantial vapor pressure, conducting the vapors from said mixture upward through a contacting zone, circulating a portion of the liquid catalyst dispersion to an upper region of said contacting zone, flowing said portion of liquid catalyst dispersion down through said zone in contact wtih the rising vapors, cooling said vapors and condensing out the aluminum halide contained therein, returning condensed aluminum halide to said reaction mixture, separating the normal butane from the isobutane in said vapors and removing and recovering said isobutane.

4. A continuous process of isomerizing normal butane to isobutane which comprises passing normal butane into a dispersion of solid aluminum halide catalyst in an inert non-hydrocarbon liquid having a boiling point substantially higher than that of normal butane, maintaining the reaction mixture thus formed at a temperature at which the aluminum halide has a substantial vapor pressure, conducting the vapors from said mixture upward through a contacting zone, circulating a portion of the liquid catalyst dispersion to an upper region of said contacting zone, flowing said portion of liquid catalyst dispersion down through said zone in contact with the rising vapors, cooling said vapors and condensing out the aluminum halide contained therein, separating the normal butane from the isobutane in said vapors, removing and recovering the thus isolated isobutane and recycling the condensed aluminum halide and normal butane to the reaction mixture.

5. A continuous process of isomerizing normal butane to isobutane which comprises passing normal butane into a dispersion of solid aluminum halide catalyst in an inert non-hydrocarbon liquid having a boiling point substantially higher than that of normal butane, maintaining the reaction mixture thus formed at a temperature at which the aluminum halide has a substantial vapor pressure, conducting the vapors from said mixture upward through a contacting tower, circulating a portion of the liquid catalyst dispersion through a cooler to an upper part of said tower, flowing said cooled catalyst dispersion down through said tower in contact with the rising vapors and thereby condensing the aluminum halide contained therein, separating the normal butane from the isobutane in said vapors by condensation, recovering the thus isolated isobutane and returning the condensed aluminum halide and normal butane to the reaction mixture.

6. A continuous process of isomerizing normal butane to isobutane which comprises passing normal butane into a dispersion of solid aluminum halide catalyst in an inert non-hydrocarbon liquid having a boiling point substantially higher than that of normal butane, maintaining the reaction mixture thus formed at a temperature at which the aluminum halide has a substantial vapor pressure, conducting the vapors from said mixture upward through a contacting tower, circulating a portion of the hot liquid catalyst dispersion to the top portion of said tower, flowing said hot catalyst dispersion down through said tower in contact with the rising vapors, thereafter cooling said vapors and condensing the aluminum halide contained therein, separating the normal butane from the isobutane in said vapors by condensation, removing and recovering the thus isolated isobutane and returning the condensed aluminum halide and normal butane to the reaction mixture.

7. In a continuous process of isomerizing normal butane to isobutane, the steps which comprise establishing and maintaining a body of inert non-hydrocarbon liquid containing solid aluminum chloride dispersed therein, said liquid having a boiling point substantially higher than that of normal butane and lower than the temperature at which aluminum chloride exerts one atmosphere vapor pressure, maintaining said liquid body at such a temperature as to partially vaporize the aluminum chloride and inert liquid contained therein, passing normal butane vapors into said liquid body to create a body of reaction mixture, conducting vapors from the body of reaction mixture so formed upwardly through a contacting zone, continuously withdrawing a portion of the hot reaction mixture from the body thereof, introducing the hot portion so withdrawn into said contact zone in the path of said vapors, returning the said portion to the body of reaction mixture in counter-current contact with said vapors, thereafter cooling the said vapors to condense therefrom all the aluminum chloride and substantially all the inert non-hydrocarbon liquid contained therein, returning the condensate of inert non-hydrocarbon liquid and aluminum chloride so separated to the body of reaction mixture, removing vapors containing isobutane free from aluminum chloride and substantially free from inert non-hydrocarbon liquid and recovering isobutane from the vapors so removed.

8. In a continuous process of isomerizing normal butane to isobutane, the steps which comprise establishing and maintaining a body of inert non-hydrocarbon liquid containing solid aluminum chloride dispersed therein, said liquid having a boiling point substantially higher than that of normal butane and lower than the temperature at which aluminum chloride exerts one atmosphere vapor pressure, maintaining said liquid body at such a temperature as to partially vaporize the aluminum chloride and inert non-hydrocarbon liquid contained therein, passing normal butane vapors into said liquid body to create a body of reaction mixture, conducting vapors from the body of reaction mixture so formed upwardly through a contacting zone, continuously withdrawing a portion of the hot reaction mixture from the body thereof, introducing the hot portion so withdrawn into said contacting zone in the path of said vapors, returning the said portion to the body of reaction mixture in counter-current contact with said vapors, cooling the vapors leaving the contacting zone to fractionally condense out all the aluminum chloride and substantially all the inert non-hydrocarbon liquid contained therein and returning the condensate so formed to said contacting zone in counter-current contact with said vapors, thereafter cooling said vapors to fractionally condense out all the inert non-hydrocarbon liquid and substantially all the normal butane contained therein, returning the condensate thus formed to the body of liquid reaction mixture, removing vapors containing isobutane free from aluminum halide and inert non-hydrocarbon material and substantially free from normal butane and recovering isobutane from the vapors so removed.

WILLIAM A. ACKERMAN.
WILLIAM S. BONNELL.